Patented June 3, 1947

2,421,507

UNITED STATES PATENT OFFICE 2,421,507

HORTICULTURAL SPRAY OIL

Paul R. Jones, Piedmont, Calif., assignor to Shell Development Company, San Francisco, Calif., a corporation of Delaware No Drawing. Application August 14, 1943, Serial No. 498,911

5 Claims. (Cl. 167—24)

The present invention relates to horticultural insecticide sprays and pertains more particularly to horticultural spray oil compositions containing relatively high concentrations of insecticidal plant extracts, such as rotenone or derris resins, and pyrethrum.

These insecticidal plant extracts, e. g. rotenone, are highly effective toxic agents for horticultural spray oil compositions. However, rotenone and other plant extracts as well as many other insecticides are very little soluble in mineral spray oils, and it has long been desired to obtain a horticultural spray oil composition containing a high concentration of rotenone and the like.

It is therefore an object of this invention to provide a new and improved horticultural spray composition. Another object is to provide a horticultural spray oil containing a relatively high concentration of rotenone or the like. It is a further object of this invention to provide an insecticidal spray comprising a novel combination of agents. It is a still further object to provide an improved method of extracting the active ingredients from plant roots and the like, such as rotenone from derris root, etc.

It has now been found that mixtures of unsaturated and saturated halogenated, preferably chlorinated, hydrocarbons of 3 to 6 carbon atoms are highly effective and inexpensive agents for promoting the solution of rotenone and the like in mineral spray oils, or for use as the sole or major vehicle itself for rotenone and the like. The polyhalogenated compounds have been found to be preferable for the present purpose. While the mixtures are generally preferred, it is sometimes desirous to use the individual semi-purified or purified components of these mixtures.

The mixtures of the present invention include the combination of unsaturated halogenated hydrocarbons of 3 to 6 carbon atoms, such as mono-chloro- and dichloro-propenes and butenes, e. g. allyl chloride, 1,3-dichloropropene, 1,2-dichloropropene, methallyl chloride, 2-chlorobutene-2, 1,4-dichlorobutene-3, etc., with halogenated propanes and butanes, such as mono-, di-, tri- and tetrachloropropanes and butanes, e. g. 1-chloropropane, 2-chloropropane, 1,2-dichloropropane, 1,3-dichloropropane, trichloropropane, 1-chlorobutane, 3-chlorobutane, 1,2-dichlorobutane, 1,4-dichlorobutane, 1,2,3-trichlorobutane, tetrachlorobutane, etc. Instead of the chlorides listed in the above examples, the corresponding bromides, iodides, or fluorides may be used, or mixed halogen compounds, such as, for example, those containing both chlorine and bromine, may be employed. For purposes of simplicity, the present invention is described by way of illustration only in relation to the preferred polychlorinated compounds. The preferred mixtures contain from 25% to 75% and preferably from 40% to 70% of the unsaturated chlorinated compounds.

A particularly effective mixture for use in compounding the present horticultural sprays is obtained as a by-product from the high temperature chlor-substitution of propene in the manufacture of allyl chloride, according to U. S. Patent 2,130,084. This mixture contains approximately 55% to 75% cis and trans 1,3-dichloropropenes, 15% to 40% 1,2-dichloropropane and 0% to 20% of higher boiling materials consisting mainly of trichloro- and tetrachloropropanes. About 80% to 90% of this mixture boils between 95° C. and 120° C.

These unsaturated and saturated chlorinated hydrocarbon mixtures containing 25% to 75% of the unsaturated compounds, and particularly mixtures containing unsaturated and saturated chlorinated hydrocarbons having 3 carbon atoms, have been found to be highly effective and superior mutual solvents and vehicles for insecticidal plant extracts such as rotenone. Since these mixtures are toxic to insects, fungi, bacteria and other pests but have a relatively low phytocidal action on most horticultural plants, they are beneficial adjuvants to rotenone compositions and other insecticidal plant derivative containing compositions for its insecticidal activity as well as for its solubilizing action. This combination of high toxicity with relatively low phytocidal action of the present chlorinated mixtures is believed to be due at least in part to the combination of the unsaturated compounds with the saturated compounds, the former providing the highly efficient toxicity and the latter acting as a deterrent to phytocidal action, both types of compounds, however, acting as solubilizing agents. Another advantage of the present agents, particularly the above-mentioned preferred chlorinated $C_3$ mixtures, is that these mixtures have the optimum volatility range and vapor pressure at ordinary atmospheric temperature to insure efficient dispersion in vapor sprays.

Insecticidal compositions containing the chlorinated hydrocarbon mixtures as the main vehicle may include 98% to 30% or less of said chlorinated hydrocarbon mixtures, 1% to 15% more or less of rotenone, pyrethrum, or other insecticidal plant derivatives or other insecticides, 0% to 60% of a mineral spray oil, and 1% to 15% of an emulsifier.

In addition to the preferred rotenone and pyrethrum and other plant toxics, such as the class known as "fish poisons" belonging to the order of Leguminosae and genera Derris, Lonchocarpus, Tephrosia, etc., known variously as tuba, cube, haiari, timbo, etc., other insecticides or fungicides may be used in combination with the chlorinated hydrocarbon mixtures to obtain highly effective horticultural insecticidal compositions. Such insecticides include, for example, nicotine, lime-sulfur; Bordeaux mixture, copper sulfate, copper carbonate; sulfur; mercury compounds; sodium, calcium, and lead arsenates; iron sulfate, phenol, paradichlorobenzene, alkene sulfides, thiuram sulfides, thiocyanates, e. g. terpenyl or dihydroisophoryl thiocyanoacetates, isothiocyanates, unsaturated cyclic ketols, such as diisophorone and its homologues, obtained by two-stage condensation of lower ketones, such as acetone, methyl ethyl ketone, etc., according to U. S. Patent 2,307,482, and the like.

It is sometimes desirable to add to such mixtures small amounts of stabilizers, such as, for example, epichlorhydrin, propylene oxide, methyl vinyl ketone, acrolein, amyl amine, ammonia, dimethyl amine, ethanol amine, dihydroisophoronyl amine, glycerol, lime water, and in some cases water alone, etc. In general, hydrochloride acceptors may be used as stabilizers for these compounds.

The preferred mineral spray oils are the petroleum white oils made by intensive acid treatment of gas oil, or lubricating oil fractions, such as machine oil, transformer oil, light or medium lubricating oils, odorless kerosene, etc. These oils may be replaced in whole or in part by vehicles, such as, for example, acetone, lignite tar oils, hydrogenated hydrocarbons, paraffin oils, naphthenes, chlorinated hydrocarbons, chlorinated ethers, fenchyl and bornyl alcohols, mono- and poly-hydric alcohols, glycol ethers, unsaturated and branch-chain aliphatic and aromatic hydrocarbons, or the like, or mixtures thereof.

As suitable emulsifiers, the following may be mentioned by way of example: various soaps, such as potassium fish-oil soap, sodium oleate, sodium resinate, triethanolamine soaps; sulfated and sulfonated preparations, such as sodium lauryl sulfate, sodium stearyl sulfate, sodium oleyl sulfate, and sodium salt of sulfonated esters of dicarboxylic acids; proteins, such as casein, egg albumen, and glue; casein-lime and casein-ammonia, fatty acid esters, such as the esters of cocoanut oil fatty acids, glyceryl mono-oleate, polyethylene glycol esters, etc.; amine salts; and the like, or combinations and mixtures thereof. A particularly effective emulsifier mixture is composed of 3 parts of esters of cocoanut fatty acids and 1 part of the sodium salt of sulfonated ester of dicarboxylic acids, which mixture is called emulsifier A for convenience and will be referred to as such hereinafter.

The insecticidal compositions of the above-noted general percentage ranges are generally used as concentrates and are emulsified with water usually immediately before spraying. The ratio of concentrate to water in the sprayed emulsion may range, for example, from 1 to 500 or less to as much as 1 to 1800 or 2500 or more when using the larger percentages of the emulsifier. The extreme dilutions are obtainable from compositions utilizing the chlorinated hydrocarbon mixtures as the main vehicle, since these particularly relatively non-phytocidal chlorinated hydrocarbon mixtures dissolve with ease relatively large amounts of plant extracts whereby high insecticidal activity can be obtained at such high dilutions. For example, 10% or more of rotenone will readily dissolve in a mixture containing about 60% 1,3-dichloropropene and 35% 1,2-dichloropropane.

As illustrative of suitable concentrates, the following examples are given:

A mixture was prepared with a composition of 5% of the above-mentioned emulsifier and 95% of a mixture containing 60% 1,3-dichloropropene and 35% 1,2-dichloropropane, in which chlorinated mixture had been dissolved 5% of rotenone. This mixture when sprayed onto trees had a high insecticidal action but showed no burning. In one particular application this mixture was diluted to about 7 cc. per gal. of water and sprayed on a prune tree which was severely infected with mealy plum louse. An excellent kill with no injury to the tree resulted. The material showed unusual wetting and wax-dissolving properties on the waxy covering of the insects. A repetition of the spray after 2 days completed the clean-up of the infestation without tree injury. In another case, this mixture was sprayed at the same dilution on cabbages and artichokes with the resultant complete kill of aphis without plant injury.

Another spray concentrate may be composed of 10% of the above-mentioned emulsifier, 50% of the above-noted chlorinated $C_3$ mixture, and 40% mineral spray oil. This concentrate may be emulsified or diluted with water to a ratio of about 1 to 1800 or 2000 to obtain a highly effective and very inexpensive insecticidal spray.

When lower dilutions are desired, less of the emulsifier may be used. For example, a suitable composition comprises 5% emulsifier, 50% of the chlorinated $C_3$ mixture, and 45% mineral spray oil.

For unemulsified oil sprays, lesser amounts of the chlorinated mixtures and additional insecticide, if any, are used. For example, insecticidal compositions of the following formulas were prepared:

Composition A consisted of 0.07% by weight of technical rotenone, 0.63% of the chlorinated $C_3$ mixture, and 99.30% of a light medium spray oil.

Composition B consisted of 0.07% of technical rotenone, 0.63% of the chlorinated $C_3$ mixture, and 99.30% of a mixture consisting of 30% odorless kerosene and 70% of a light mineral oil having a Saybolt viscosity of 46 seconds at 100° F., an unsulfonatable residue of 89.5% by volume and 95% distilling below 636° F.

Composition C consisted of 0.035% of technical rotenone, 1.00% of the chlorinated $C_3$ mixture, and 98.965% of a mixture of 30% odorless kerosene and 70% of the light mineral oil of the characteristics noted in composition B.

Composition D consisted of 10.0% of the chlorinated $C_3$ mixture and 90.0% of a mixture of 30% odorless kerosene and 70% of the light mineral oil as in compositions B and C.

The above compositions A, B and C were all bright and clear with no trace of a rotenone precipitate as is often the case with the heretofore used solubilizing agents, such as ethylene dichloride. Compositions B, C and D were sprayed on bean foliage as a vapor spray with a high insecticidal action and no harmful effects on the plants.

In another series of tests the solubility of rotenone and derris resin (33⅓% rotenone) in a mixture comprising about 60% 1,3-dichloropropene and 35% 1,2-dichloropropane was tested at several concentrations. Several solutions of different concentrations were made up and placed in an ice-box at 30° F. to 50° F. overnight and after several days observations as to turbidity, coagulant suspended precipitate, and precipitate were made. The results are given in the following table:

| Ingredients | Composition numbers | | | | |
|---|---|---|---|---|---|
| | 1 | 2 | 3 | 4 | 5 |
| Dichloropropene dichloropropane mixture, per cent b. w. | 95 | 90 | 90 | 80 | 70. |
| Technical rotenone, per cent b. w. | 5 | 10 | | | |
| Derris resins, per cent b. w. | | | 10 | 20 | 30. |
| *Tests* | | | | | |
| Turbidity | None | None | None | None | None. |
| Coagulant suspended precipitate | do | do | do | do | Do. |
| Precipitate | Very slight | Slight | Slight | Slight | Slight. |

Other particular combinations of insecticides with the mixtures of saturated and unsaturated hydrocarbons of 3 to 4 carbon atoms may be highly desirable. For example, combinations of diisophorone, aliphatic thiocyano esters, and said chlorinated hydrocarbon mixture; or of diisophorone, nicotine or nicotine sulfate, and said chlorinated hydrocarbon mixture; or of diisophorone, pyrethrum or rotenone, and said chlorinated hydrocarbon mixture, with or without a mineral spray oil or water, may be used.

These mixtures of halogenated hydrocarbons with other insecticides, especially rotenone and pyrethrum, may be absorbed or mixed with finely divided materials, such as wood fiber or flour, talc, clay, sulfur, carbon black, etc., and be used as dusting insecticides.

The mixtures of unsaturated and saturated halogenated lower hydrocarbons of 3 to 6 carbon atoms may likewise be used to extract the active toxic ingredients from plants, such as rotenone from the crude derris root, pyrethrum extract from pyrethrum flowers, etc. These mixtures or components thereof, either cold or hot, may be used alone or in combination with mineral oils or other extractants to extract, for example, rotenone from comminuted or uncomminuted derris root. Any suitable or well-known extraction, contacting, and separating steps and apparatus may be used.

I claim as my invention:

1. A clear mineral oil horticultural spray containing dissolved a minor proportion exceeding its normal solubility in said mineral oil of rotenone and a minor but rotenone-solubilizing proportion of a mixture of polychlorinated propenes and propanes.

2. A clear mineral oil horticultural spray containing dissolved a minor proportion exceeding its normal solubility in said mineral oil of rotenone and a minor but rotenone-solubilizing proportion of a mixture of polychlorinated alkanes and alkenes of from 3 to 4 carbon atoms.

3. The mineral oil spray according to claim 2, wherein the polychlorinated alkenes are monounsaturated.

4. A clear mineral oil horticultural spray containing dissolved a minor proportion exceeding its normal solubility in said mineral oil of rotenone and a minor but rotenone-solubilizing proportion of a mixture of polyhalogenated alkanes and alkenes of from 3 to 4 carbon atoms.

5. A clear mineral oil horticultural spray containing dissolved a minor proportion exceeding its normal solubility in said mineral oil of rotenone and a minor but rotenone-solubilizing proportion of a mixture of polychlorinated butenes and butanes.

PAUL R. JONES.

REFERENCES CITED

The following references are of record in the file of this patent:

UNITED STATES PATENTS

| Number | Name | Date |
|---|---|---|
| 1,945,235 | Sankowsky | Jan. 30, 1934 |
| 2,057,044 | Meisenburg et al. | Oct. 13, 1936 |

FOREIGN PATENTS

| Number | Country | Date |
|---|---|---|
| 449,210 | Great Britain | June 23, 1936 |
| 494,740 | Great Britain | Jan. 20, 1937 |

OTHER REFERENCES

Jr. Amer. Chem. Soc., v. 59, page 2695.

Ind. & Eng. Chem., v. 21, No. 12, pages 1251–1253.

Jones et al., Jr., Amer. Chem. Soc., v. 52, 1930, page 2558.

Carter, Science, April 23, 1943, pages 383–384.